US008051876B2

(12) United States Patent  (10) Patent No.: US 8,051,876 B2
Voss  (45) Date of Patent: Nov. 8, 2011

(54) PRESSURE LIMITING VALVE WITH A HYDRAULIC SEAL RING

(76) Inventor: Wolfgang Voss, Schwerte (DE)

( * ) Notice: Subject to any disclaimer, the term of this patent is extended or adjusted under 35 U.S.C. 154(b) by 622 days.

(21) Appl. No.: 10/588,013

(22) PCT Filed: Jan. 12, 2005

(86) PCT No.: PCT/DE2005/000028
§ 371 (c)(1),
(2), (4) Date: Aug. 1, 2006

(87) PCT Pub. No.: WO2005/075864

PCT Pub. Date: Aug. 18, 2005

(65) Prior Publication Data
US 2007/0095404 A1    May 3, 2007

(30) Foreign Application Priority Data

Feb. 5, 2004 (DE) .................. 10 2004 005 747

(51) Int. Cl.
F16K 31/36 (2006.01)
(52) U.S. Cl. ........ 137/508; 137/538; 251/172; 251/175; 251/186
(58) Field of Classification Search .................. 137/494, 137/496, 538, 508; 251/172, 175, 186
See application file for complete search history.

(56) References Cited

U.S. PATENT DOCUMENTS

| 2,655,173 A | * | 10/1953 | Overbeke | 137/469 |
| 3,344,806 A | * | 10/1967 | Schultz | 137/494 |
| 3,497,177 A | * | 2/1970 | Hulsey | 251/172 |
| 4,176,680 A | * | 12/1979 | de Launay | 137/496 |
| 4,256,137 A | * | 3/1981 | de Launay | 137/496 |
| 4,313,463 A | * | 2/1982 | Weirich | 137/538 |
| 4,958,656 A | * | 9/1990 | Patel | 137/467 |
| 5,139,274 A | * | 8/1992 | Oseman | 277/552 |
| 5,285,813 A | * | 2/1994 | Quante et al. | 137/494 |
| 5,431,415 A | * | 7/1995 | Millonig et al. | 277/353 |
| 5,462,076 A | * | 10/1995 | Voss | 137/454.5 |
| 5,695,197 A | * | 12/1997 | Farley et al. | 277/311 |
| 5,722,637 A | * | 3/1998 | Faramarzi et al. | 251/190 |
| 5,924,444 A | * | 7/1999 | Fendel | 137/538 |
| 6,290,235 B1 | * | 9/2001 | Albertson | 277/510 |

FOREIGN PATENT DOCUMENTS

| DE | 8437091 | 9/1985 |
| EP | 0096303 | 12/1983 |
| GB | 2159923 | 12/1985 |

* cited by examiner

Primary Examiner — Stephen M Hepperle
Assistant Examiner — William McCalister
(74) Attorney, Agent, or Firm — James Creighton Wray

(57) ABSTRACT

The invention relates to a pressure limiting valve with a hydraulic seal ring (12), characterized in that the sealing element (6), for securing the flow gap (10) between the consumer connection (3) and the pressurized fluid outlet (4), is embodied as a seal ring (12) with a limited flexibility. Said seal ring (12) is inserted without preload into a groove (13) provided therefore, whereby said groove (13) is embodied so as to allow the flow of pressurized fluid (11) behind the seal ring (12).

16 Claims, 4 Drawing Sheets

PRESSURE LIMITING VALVE WITH A HYDRAULIC SEAL RING

This application claims the benefit of German Application No. 10 2004 005 747.8 filed Feb. 5, 2004 and PCT/DE2005/000028 filed Jan. 12, 2005, which are hereby incorporated by reference in their entirety.

BACKGROUND OF THE INVENTION

The invention relates to a pressure limiting valve for the protection of hydraulic power packs against overload, in particular, for the protection of hydraulic props in underground mining and tunnel construction against falling rocks, comprising a valve housing with consumer connection and pressurized fluid outlet, which are separated from one other by means of a movable closure device with a seal securing the flow gap between the pressurized fluid outlet and the consumer connection, which closure device is movable against the force of a valve spring, and are connected to one another if an overload occurs in order to discharge the pressurized fluid.

Pressure limiting valves are used in various hydraulics-related areas, in particular, to protect hydraulic power packs against overload. A valve piston is normally disposed in a valve housing such that in case of overload it passes over a seal and allows the pressurized fluid to flow off through the pressurized fluid outlet until the overload has been reduced and the valve can close again. The seal to be passed over by the closure device of the valve, typically a valve piston movable in a piston bore, is exposed to high loads because the closure device is pressurized by the compressed pressurized fluid, and even so has to remain in a state that ensures overall sealing of the system. As a result of the pressure, the seal is deformed in such a way that it projects into the flow gap between the movable closure device and the fixed component, and therefore is exposed to severe stress at the start of movement of the closure device. Hence, the lifetime of such seals is limited. This applies particularly for the valve described in EP-A-0 096 303.

The O-ring, which can be deformed like plastic mass and is inserted prestressed, is deformed when passing over the radial bores of the valve piston (closure part) such that the flow gap is closed by the developing annular projection. With the valve configuration according to DE-8 437 091 U1 and GB-A-2 159 923 the seal rings are fitted into the respective groove or are inserted prestressed therein in the case of both valve pistons in order to ensure an accurate seat of the O-ring. Here as well the O-ring is pressed into the flow gap, and the developing annular projection creates the afore-mentioned wear problems. The problems described cannot be resolved even the reduced thickness of the O-ring because again the hydraulic pressure occurring in the groove or acting in the groove acts in the direction of the flow gap, and is in fact supposed to act in that direction, because, as is indicated in FIG. 3 of EP-A-0 096 303, this closure is the objective of the deformation. DE-3 909 461 A1 shows among a variety of illustrations in FIG. 3 also such a "reduced" O-ring. The shape and arrangement as well as the material of these known O-rings result in the afore-mentioned disadvantageous deformation and consequently to the premature failure of these pressure limiting valves, which are important for safety reasons.

SUMMARY OF THE INVENTION

The object of the present invention is to provide a sealing arrangement above all for pressure limiting valves, which arrangement ensures long lifetimes and is configured to increase the sealing effect.

According to the present invention, the intended object is achieved by the fact that the seal is a seal ring with limited flexibility, which can be inserted without prestress, and consequently displaceably in the direction towards the closure device, into a groove provided for this purpose, whereby said groove is designed to allow flow as far as into the groove base or partial flow of the pressurized fluid behind the seal ring.

The pressurized fluid flowing behind the seal ring is the system pressure fluid, thus it is the "normal system pressure". As a result of the special configuration of the seal ring and the groove, said system pressure fluid can flow past the partition into the groove base, so that the seal ring may additionally be pressed into the sealing surfaces by the pressurized fluid. As the seal ring is inserted without prestress, it can also be securely pressed out of the groove by the system pressure or the pressurized fluid far enough that it firmly closes the flow gap, ensuring the sealing of the entire system. In the problematic case, for instance, of the hydraulic props being exposed to falling rocks, the closure device, i.e. normally the valve piston, is pressed out of its seat, and specifically against the force of the valve spring, whereby it so passes over the seal ring that said seal ring is completely influenced by the overload pressure of the pressurized fluid and is pressed into the groove. Thus, said seal ring is secured when passing over the corresponding passage opening or radial bore and cannot be affected by sharp edges or the extremely pressurized fluid. Once the radial bore has been passed over to a great extent by the seal ring, the pressurized fluid can flow off with increased pressure and the approximate normal pressure is reestablished. Now the higher pressure is present in the so-called damping chamber and reaches the area of the seal ring through the annular gap between the closure device and the fixed component, pressing said seal ring into the sealing position so that the contact surface slides firmly with friction on the seal face. This in turn ensures optimal sealing in this area. The described pressure limiting valve is thus secured by a hydraulic seal ring, or rather, by the seal ring that can be moved to the sealing position by the pressurized fluid.

It is especially advantageous if the seal ring has a rectangular, preferably square cross-section, because "optimal movement" of the seal ring and an optimal "areal" sealing effect can be achieved this way.

According to an exemplary embodiment of the present invention, it is provided that the groove and seal ring are positioned such that the seal ring is also compressed by the system pressure fluid when the valve is closed. This is particularly achieved in that, when the valve is closed, the system pressure fluid can flow through the defined flow paths past the seal ring into the groove. Thus, the system pressure fluid advantageously compresses the seal ring firmly.

According to another exemplary embodiment, it is provided that the groove and seal ring are arranged and embodied such that they partially extend into the cross-sectional opening of the bore connecting with the flow gap, whereby the connection bore is preferably embodied as a radial bore. In other words, with an embodiment of this type, when the valve is closed, the system pressure fluid can always flow past the seal ring into the groove on the defined path, subsequently pressing the seal ring out of its seat in the groove, and specifically onto the sealing surface. To this end, it suffices if the groove and seal ring just barely project above the radial bore to allow the system pressure fluid to precisely enter into the defined gap in order to act on the seal ring.

The described sealing arrangement comprising the groove and seal ring can be implemented particularly well if the consumer connection is configured and arranged with a blind hole at the connection, and if radial bores are provided at the end of the blind hole at the height of the flow gap. Thus the path of the system pressure fluid, and also of the overload pressure fluid, is predetermined, because it can flow without difficulty from and through the connection into the area of the sealing arrangement in order to act on the seal ring to achieve optimal sealing effect, as described above.

In order to favor the inflow of the system pressure fluid into the groove base, it is advisable that the groove has an oblique partition, creating a funnel-type opening, along the groove base in the area of the system pressure fluid inflow. As the seal ring is configured with a square or rectangular shape, the above-mentioned funnel opening is situated flanked by the oblique partition of the groove, through which the system pressure fluid can flow exactly into the groove base. Thus the gap opening is enlarged by the inflow of the pressurized fluid, so that the system pressure fluid can in fact reach the groove base, and from there reaches behind the seal ring to act on it correspondingly.

The pressure build-up in the groove base, i.e. behind the seal ring rapidly becomes effective if a salient is provided in the groove base. A sort of pressure bubble is formed.

Another possibility for configuring an adequate funnel opening or inflow opening is such that the wall of the groove opposite the oblique partition is arranged in a way that it provides radial fixation to, but allows axial movement of, the seal ring. This means that the seal ring can move in the direction of the sealing surface, however it cannot modify the funnel opening, thereby always ensuring inflow of the system pressure fluid. Finally, it is also possible to keep the funnel opening open by force, wherein it is conceivable that the partition has spacers acting on the seal ring. The spacers would keep a corresponding gap open, wherein said spacers do not obstruct the flow of the system pressure fluid, however will of course be affected by the back and forth movement of the seal ring. In this respect, said spacers should be given special consideration.

The described embodiment of the groove and seal ring is particularly applicable when, according to the present invention, the connection comprising the consumer connection has a piston-like attachment, on which a top hat shaped top part, and a spring disk with a top hat brim are arranged passing over the radial bores in the attachment against the force of the valve spring, whereby the flow gap between the lower part of the top hat brim and the upper part of the connection is configured such that it extends up to the outlet ports forming the pressurized fluid outlets. In said embodiment and arrangement of the groove and seal ring, only the spring disk is movable, while the piston-like attachment virtually assumes the function that has so far usually been assigned to the valve piston. The movement of the spring disk is guided on the piston-like attachment, wherein the groove and seal ring is associated with the spring disk, i.e. with the movable part. Just after a short path, the pressure fluid can flow off through the flow gap between the lower part of the top hat brim and the upper part of the connection, so that the overpressure can rapidly be reduced. To that effect the groove and seal ring are arranged in the area of the lower top hat brim, so that said the aforementioned small and short paths suffice in order to provide an adequate cross-section of the opening for the pressure medium flowing off.

The flow gap below the top hat brim and above the connection must naturally be deviated by 90°, wherein it is advantageous if the embodiment of the corner between the upper part of the connection and the attachment is rounded off. Thus the path for the rapidly flowing pressure fluid is predetermined, however at the same time it is ensured that wear is largely kept to a minimum in this area.

The reliable response of the seal ring when moved inside the groove is favored by the fact that, according to a further embodiment of the present invention, the edge facing the bottom side of the top hat brim is beveled. Thus a cavity forms following the brief lifting of the spring disk, the pressure fluid being able to flow into this cavity, so as to aid the lifting process of the spring disk. Said bevel is still further advantageous in that the pressurized fluid flowing off through the radial bores does not encounter a sharp corner upon passing over the radial bores, but rather is discharged optimally along the bevel. By exactly influencing the seal ring also in this section, it is furthermore ensured that the pressurized fluid does not flow into the gap between the piston-type attachment and the spring disk. Further details will be pointed out below.

As explained above, the sealing ring is a seal ring that can be inserted without prestress into a groove provided for this purpose and it should have limited flexibility. The assembly of the seal ring as well as its mode of action are particularly optimal if the seal ring is made of plastic material, preferably polyamide. The choice of the material ensures a permanent leak-proof fit, even if said seal ring becomes minimally deformed, if at all, when moving inside the groove.

This secure leak-proof fit is further ensured by the fact that the plastic seal ring has sharp edges in the contact area of the sealing surface at the piston-type attachment. Said sharp edges ensure that the whole sealing surface of the seal ring is solidly seated and that even "eating away" at the seal in the brim area is not possible at all.

The present invention is particularly characterized in that a sealing arrangement for pressure limiting valves has been created that comprises a seal ring disposed in a groove, wherein both are configured so as to enable the inflowing system pressure fluid to specifically influence the seal ring inside the groove. Thereby the seal ring is moved out of the groove to a limited extent and pressed onto the sealing surface, so that a precise and desired sealing effect is always ensured. Upon passing over the radial bores, the seal ring is subjected completely to the system pressure fluid, or rather the overpressure fluid, so that it is pressed into the groove and not damaged even when passing over the brims of the radial bores. Only after the passing over has been concluded, is the seal ring influenced by the system pressure fluid remaining in the system, which ensures that the ring is moved into the leak-proof fit position and thereby seals the sealing surface so that in this situation and position an optimal sealing effect is ensured as well. A particularly preferred embodiment of the present invention provides a pressure limiting valve, in which only the correspondingly configured spring disk moves when overload occurs, while the connection with a piston-type attachment extending into the spring disk ensures that the spring disk moves uniformly, and that the overpressure fluid can flow off securely after passing over the radial bores. In the present arrangement and invention the seal ring is protected, so that a long lifetime is achieved. Moreover, optimal sealing of the pressure limiting valve in all positions is ensured.

Further details and advantages of the subject of the present invention will be apparent from the following description of the corresponding drawings, which illustrate a preferred exemplary embodiment with the necessary details and individual parts. In the drawing:

DETAILED DESCRIPTION OF THE PREFERRED EMBODIMENTS

Figure 1:
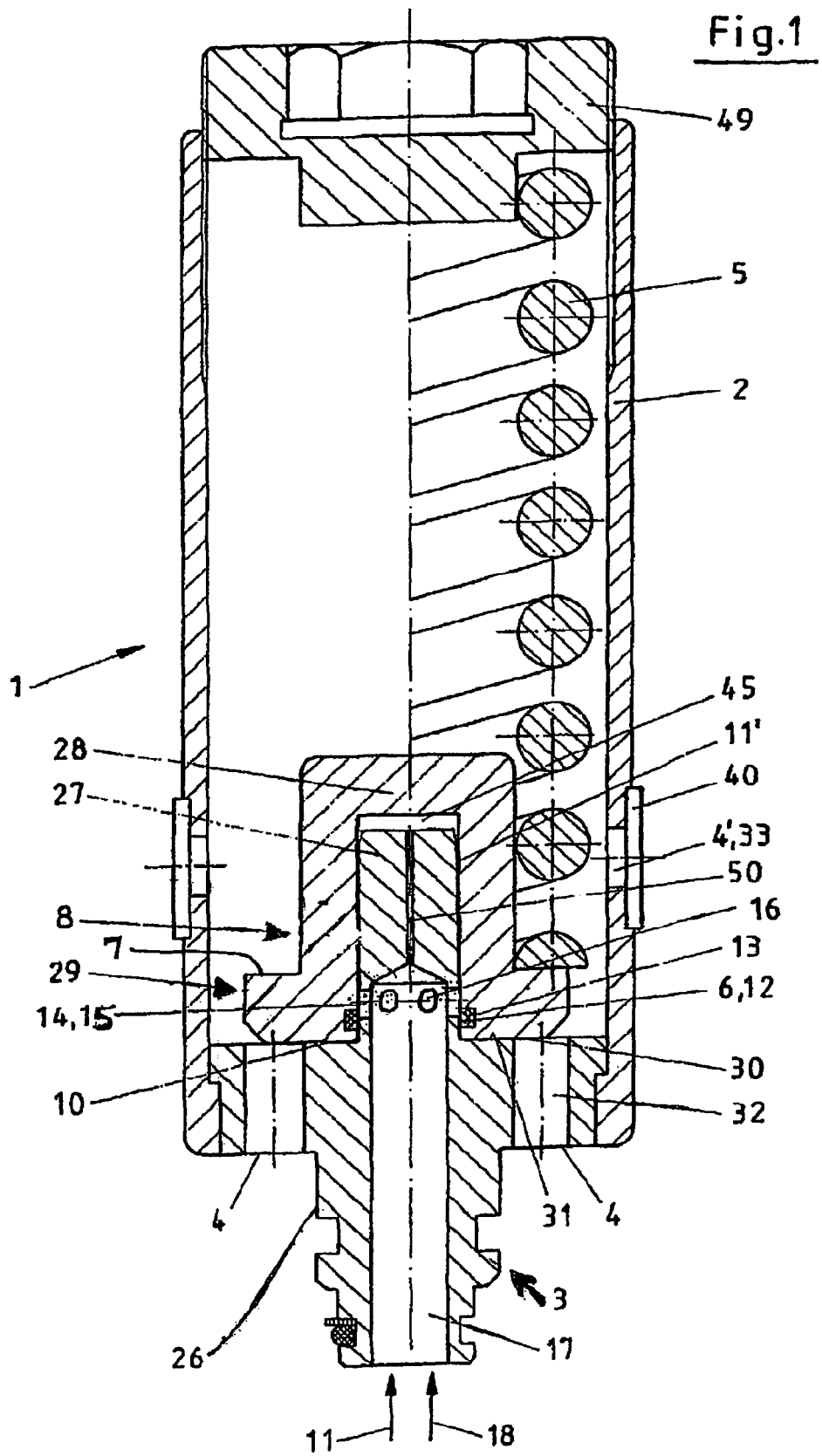
FIG. 1 shows a pressure limiting valve in a sectional view with sealing arrangement.

In the pressure limiting valve 1 shown in FIG. 1, in addition to the special sealing arrangement, the configuration of the spring disk 7 and connection 26 with the piston-type attachment 27 are especially relevant.

The pressure limiting valve 1 is shown in a sectional view, wherein it is clear that the valve housing 2 has a consumer connection 3 and pressurized fluid outlet 4, both of which are embodied in the area of the connection 26. A valve spring 5 arranged inside the valve housing 2 is supported on the spring disk 7, which virtually represents the movable closure device 8. Said closure device 8 and the seal 6 ensure the effective separation between the consumer connection 3 and the pressurized fluid outlet 4 when the valve is in the closed position.

The connection between the consumer connection 3 and pressurized fluid outlet 4 is represented by the flow gap 10. In FIG. 1 it is evident that owing to the seal arrangement a passage of the pressurized fluid 11 or system pressure fluid is not possible. The seal ring 12 is seated sufficiently wide on the piston-like attachment 27 for the flow gap 10 to be closed.

The seal ring 12 is made of polyamide or similar plastic material and can be placed in the provided groove 13—shown here in the movable spring disk 7—without prestress. The opening cross-section 14 of the connection bores 15, in the shape of radial bores 16 in this example, is so dimensioned that if an overload occurs adequate amounts of pressurized fluid can be discharged, and specifically through said flow gap 10.

In case of overload, the overpressure fluid 18 is present in the blind hole 17 and ensures that the spring disk 7 is moved against the force of the valve spring 5. Thereby, said overpressure fluid 18 reaches the area of the flow gap 10 through the blind hole 17 and radial bores 16, and also reaches the area of the damping chamber 45 through the throttle bore 50. This damping chamber 45 is enlarged with the initial movement of the spring disk 7, so that during the subsequent closure of the pressure limiting valve this pressurized fluid has to be pressed primarily through the throttle bore 50 before the spring disk 7, and thereby the valve spring 5, move to the initial position.

When the spring disk 7 is lifted, the seal ring 12 passes over the radial bores 16, and is then pressed into the groove base 20, so that the overpressure fluid 18 can be discharged through the flow gap 10. Said flow gap 10 is located between the bottom side 30 of the top hat brim 29 and the top side 31 of the connection—26 this will be explained below—and ends in the area of outlet port 32. If not enough pressurized fluid can be discharged, the outlet ports 33 in the partition of the valve housing 2 are also available, so that sufficient pressurized fluid may always be discharged. These outlets ports 33 are covered with a seal ring 40 with limited flexibility in order to prevent dirt from entering.

Once the overpressure in the consumer has been reduced, the system pressure fluid 11 is again present in the blind hole 17. As a result, the top hat shaped top part 28 is reset to the sealing position by the valve spring 5 acting on the top hat brim 29. The pressurized fluid present in the damping chamber 45 ensures a damped movement.

Figure 2:
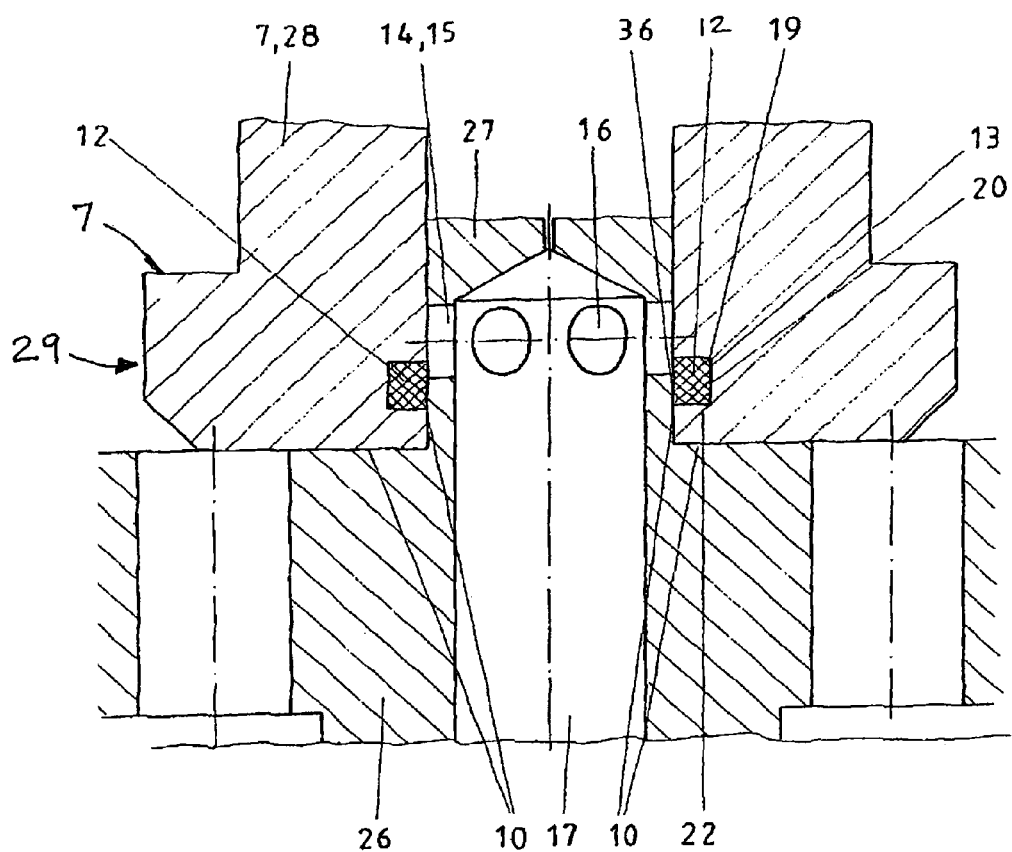
FIG. 2 shows an enlarged illustration of the sealing arrangement area.

FIG. 2 shows the enlarged sealing area, wherein it can be seen that the size of the groove 13 is slightly larger than that of the seal ring 12. Thereby a pressure gap 19 forms, through which the system pressure fluid 11 can penetrate through the radial bore 16 in order to influence the seal ring 12 accordingly. This will be explained further in detail below. The groove 13 has a beveled partition 21 in the area of the pressure gap 19 so as to define it. As a rule, the opposite groove partition 22 is embodied perpendicular to the groove base 20 so that the seal ring 12 can press precisely along said groove partition 22 and with its brim 38, 39 on the seal face 36. Said sealing surface is also referred to as the contact sealing surface 37 in FIG. 3, whereby it is clear there that said contact sealing surface 37 is always dimensioned such that no canting of the seal ring 12 occurs, but instead specific influence occurs in the direction of the sealing surface 36 or contact sealing surface 37.

Figure 3:
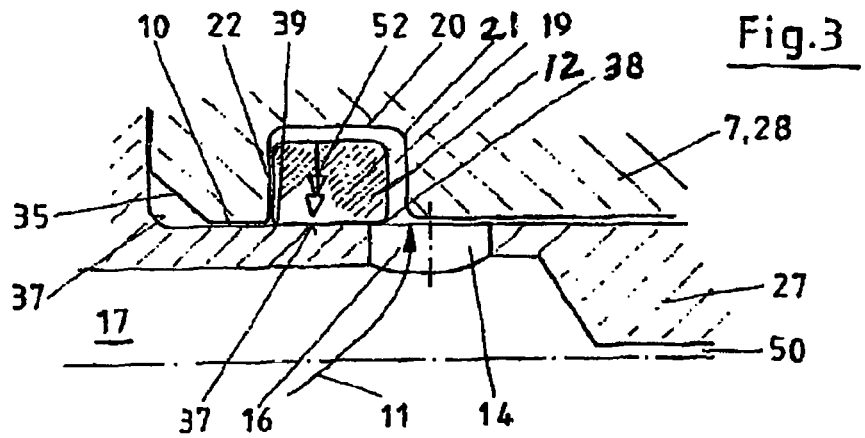
FIG. 3 shows the arrangement of the seal ring with the valve in the closed position.
Figure 4:
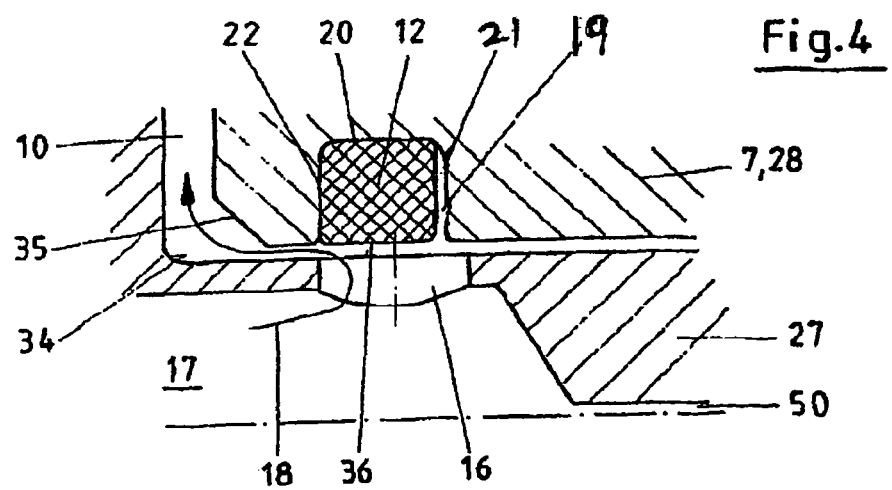
FIG. 4 shows the arrangement of the seal ring upon passing over the radial bores.
Figure 5:
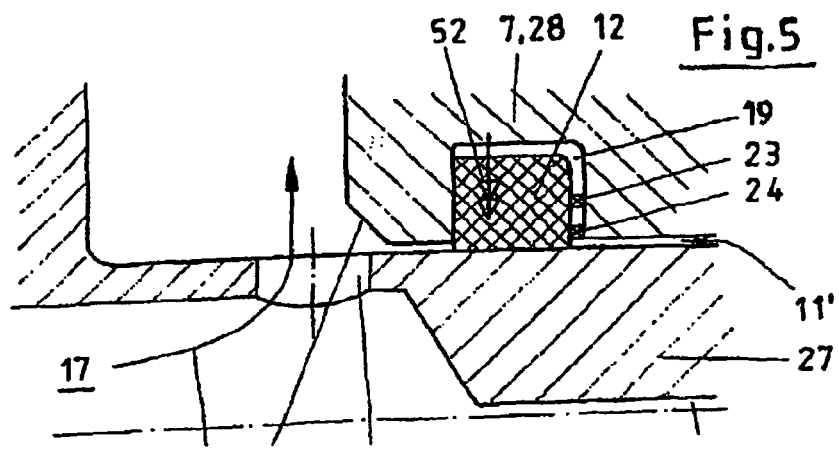
FIG. 5 shows the arrangement of the seal ring after passing over the radial bores and FIG. 6 shows another embodiment of the pressure limiting valve in a sectional view.

FIGS. 3, 4 and 5 show the different positions of the seal ring 12 during operation of this type of pressure limiting valve 1. FIG. 3 shows the initial status, where the system pressure is present, so that system pressure fluid 11 can flow into the pressure gap 19, as the direction of the arrow indicates. Said pressure gap 19, and also the gap that can be seen in the area of the groove base 20, are drawn larger than their actual sizes in order to indicate which segment movement is taking place at this point. The seal ring 12 is pressed by the system pressure fluid 11 in the direction of the opposite groove partition 22 and subsequently is pressed also in the direction of the contact sealing surface 37 by the inflowing system pressure fluid 11 into the area of the groove base 20. The direction of the arrows indicates the pressure direction 52.

The seal ring 12 shown in FIGS. 3 to 5 has sharp edges 38, 39 in the area of the sealing surface 36. Consequently, complete sealing is ensured upon contact with the contact sealing surface 37.

FIG. 3 as well as 4 and 5 furthermore show that the corner 34 between the top side 31 and the piston-type attachment 27 is rounded to facilitate the discharge of the overpressure fluid 18 as shown in FIG. 4. Additionally, the edge 35 at the bottom side 30 of the top hat brim 29 is beveled, also in order to facilitate hereby the discharge of the overpressure fluid 18 as well, but at the same time to prevent the pressurized fluid from discharging not at all or insufficiently in the position shown in FIG. 5 and also to prevent the pressurized fluid from flowing in the direction of the gap towards the seal ring 12. On the contrary, the overpressure fluid 18 is guided specifically at the outset, as shown in FIGS. 4 and 5.

FIG. 4 in particular shows that the partition 21 is beveled, forming the afore-mentioned pressure gap 19. In order to keep it open, the arrangement of spacers 23, 24 is provided according to FIG. 5.

From the position shown in FIG. 5, the seal ring 12 has long passed over radial bore 16 and is now being influenced by the damping chamber 45 or the pressurized fluid 11' present therein. Said pressurized fluid 11' then reaches the seal ring 12 through said gap, again shown in exaggerated size in FIG. 5, where it reaches the area of groove base 20 via the pressure gap 19, achieving the sealing effect indicated in FIG. 5.

When the valve closes again and thereby the spring disk 7 is pressed back to the position shown in FIG. 3, the pressure-relieved seal ring 12 again passes over the radial bore 16 as soon as it reaches the area of radial bore 16.

Figure 6:
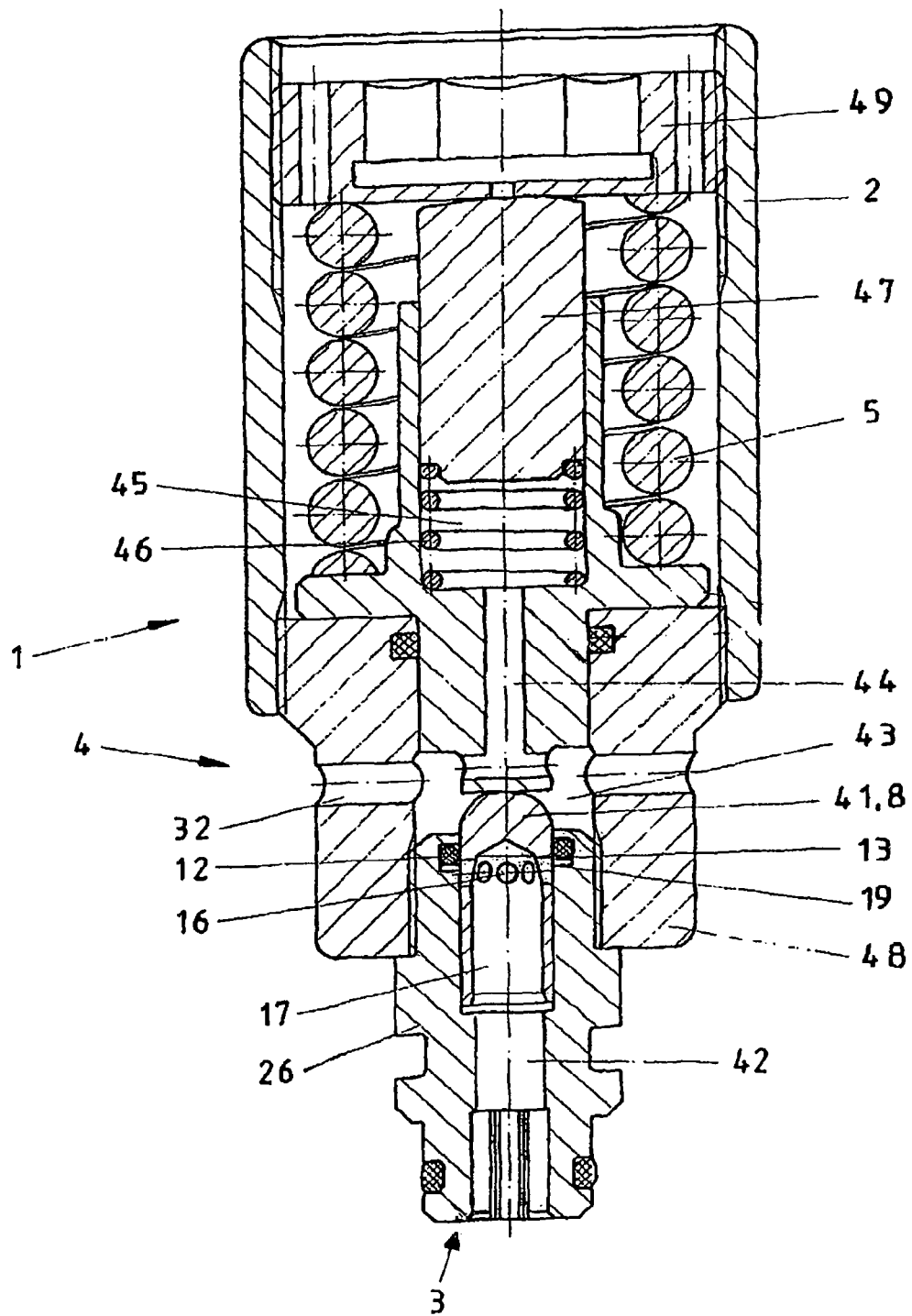

Finally, FIG. 6 shows a further embodiment of a pressure limiting valve 1, wherein a valve piston 41 is used, which is displaced movably in the piston bore 42. It also has a blind hole 17 and radial bores 16 at the end sides, which, upon passing over the seal ring 12, ensure the discharge of the overpressure fluid 18, and specifically through the discharge chamber 43 and outlet ports 32. At the same time, the pressurized fluid is guided through the disk bore 44 to the damping chamber 45, in order to produce a damping effect when the pressure limiting valve 1 closes again. The damping spring 46 supports the damping effect. It presses against the damping plunger 47. 48 designates an intermediate piece, in which the outlet ports 32 and discharge chamber 43 are configured, and which accommodates the actual connection 26. At the upper end of the valve housing 2, just as in the illustration according to FIG. 1, an adjusting spring screw 49 is provided, which allows exact tightening of the valve spring 5.

All features that have been mentioned, including those solely disclosed in the drawings, are considered to be essential to the invention, both alone and in combination.

The invention claimed is:

1. A pressure limiting valve device for protecting hydraulic pressure packs against an overload and hydraulic props against falling rocks in underground mining and tunnel construction comprising a valve housing, a consumer connection coupled to the valve housing, a pressurized fluid outlet in the consumer connection for allowing flow of pressurized fluid, a movable closure in the valve housing for ensuring separation of the pressurized fluid outlet and the consumer connection, a flow gap between the movable closure and the pressurized fluid outlet, a valve spring in the valve housing for exerting force such that the movable closure is movable against the force exerted, a seal on the movable closure for securing the flow gap, the valve housing and the consumer connection remaining connected when the overload occurs for discharging the pressurized fluid, wherein the seal comprises a groove and a non pre-tensioned seal ring with limited flexibility disposed in the groove without pre-stressing, the seal ring having a first side facing the consumer connection, a second side opposite the first side away from the consumer connection, top and bottom opposite sides between the first side and the second side, the groove having a shape for allowing partial or total flow of the pressurized fluid into the groove and around the seal ring, and wherein the seal ring is displaceable towards the consumer connection due to flow of the pressurized fluid on sides of the seal ring including the second side away from the consumer connection; the device further comprising a system pressure fluid, and wherein the groove and the seal ring are disposed in the movable closure such that the system pressure fluid acts on the seal ring when the valve is in a closed position, the device further comprising a blind hole in the consumer connection and connection bores connecting the blind hole and the flow gap, wherein the groove and the seal ring partially extend into opening cross-sections of the connection bores when the device is in a fully closed position.

2. The pressure limiting valve device of claim 1, wherein the seal ring comprises a rectangular cross-section.

3. The pressure limiting valve device of claim 2, wherein the seal ring has a square cross-section.

4. The pressure limiting valve device of claim 1, wherein the connection bores are radial bores.

5. The pressure limiting valve device of claim 4, wherein the blind hole is disposed in a connection portion of the consumer connection connected to the valve housing, and wherein the radial bores are disposed proximal an end side of the blind hole at a height of the flow gap.

6. The pressure limiting valve device of claim 1, wherein the groove comprises first and second opposing sides and a base between the first and second opposing sides, a beveled funnel-type partition along the first side and the base, and a funnel opening formed by the funnel-type partition.

7. The pressure limiting valve device of claim 6, further comprising a beveled partition on the second side of the groove for delimiting radial movement but allowing axial movement of the seal ring.

8. The pressure limiting valve device of claim 7, wherein the beveled partition comprises one or more spacers for influencing the seal ring.

9. The pressure limiting valve device of claim 1, wherein the seal ring is formed of plastic material.

10. The pressure limiting valve device of claim 9, wherein the seal ring is formed of polyamide material.

11. The pressure limiting valve device of claim 1, further comprising a connection nipple on the consumer connection and a piston-type attachment in the movable closure.

12. The pressure limiting valve device of claim 11, further comprising outlet ports connected to the pressurized fluid outlet, wherein the flow gap extends to the outlet ports.

13. The pressure limiting valve device of claim 11, further comprising a rounded corner formed by a top side of the connection nipple and a side of the piston-type attachment.

14. The pressure limiting valve device of claim 11, further comprising a beveled edge toward a bottom side of the top hat brim.

15. The pressure limiting valve device of claim 11, further comprising sharp edges on the first side of the seal ring facing the piston-type attachment.

16. The pressure limiting valve of claim 11, wherein the movable closure comprises a top hat portion, a spring disk and a top hat brim movable over the radial bores against the force of the valve spring, wherein a bottom side of the top hat brim and a top side of the connection nipple enclose the flow gap.

* * * * *